B. DARROW.
APPARATUS AND METHOD FOR BUILDING PNEUMATIC TIRES.
APPLICATION FILED AUG. 9, 1918.
1,335,879.
Patented Apr. 6, 1920.
2 SHEETS—SHEET 1.
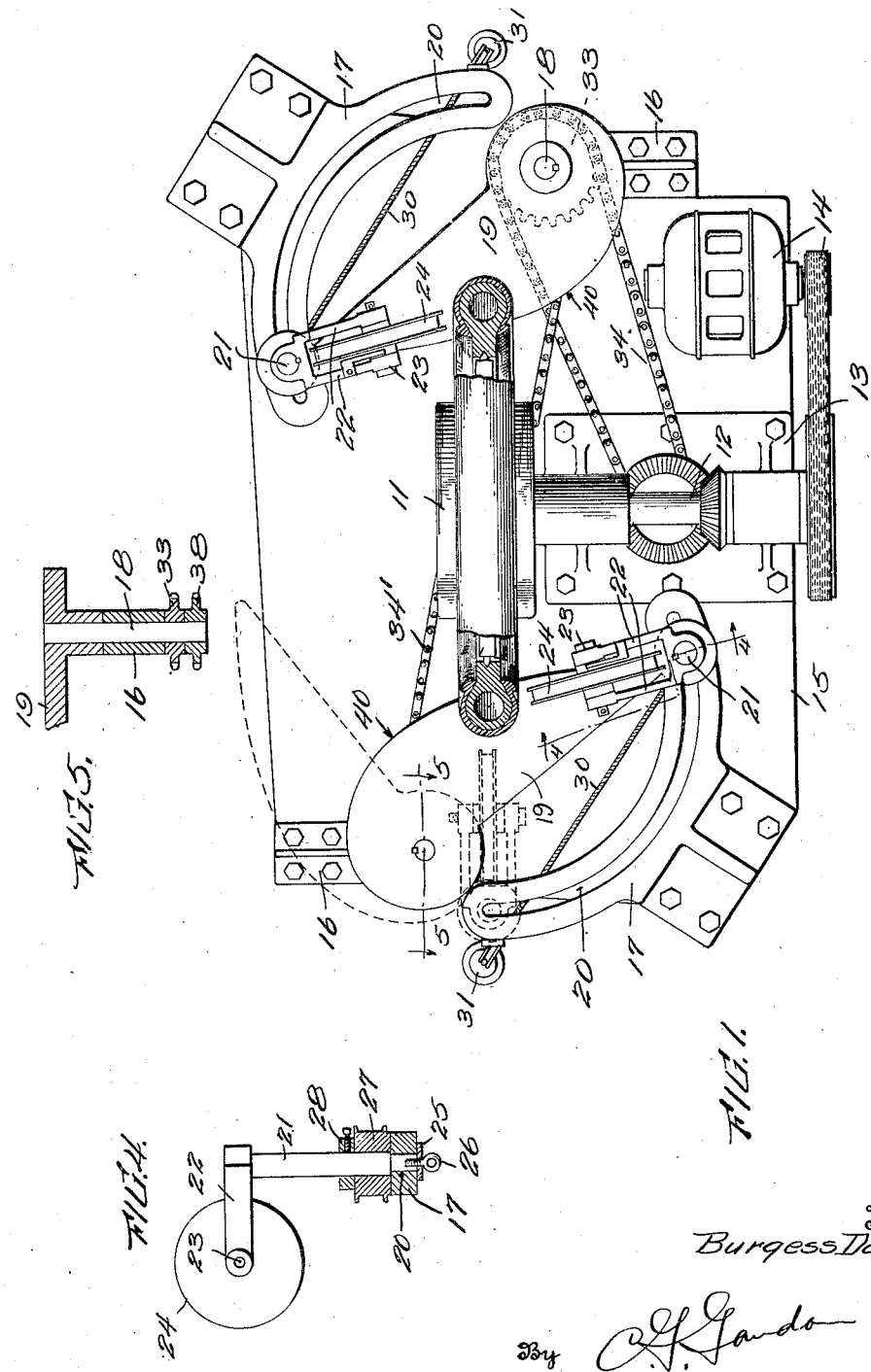
Inventor
Burgess Darrow,
By
his Attorney.

B. DARROW.
APPARATUS AND METHOD FOR BUILDING PNEUMATIC TIRES.
APPLICATION FILED AUG. 9, 1918.
1,335,879.
Patented Apr. 6, 1920.
2 SHEETS—SHEET 2.
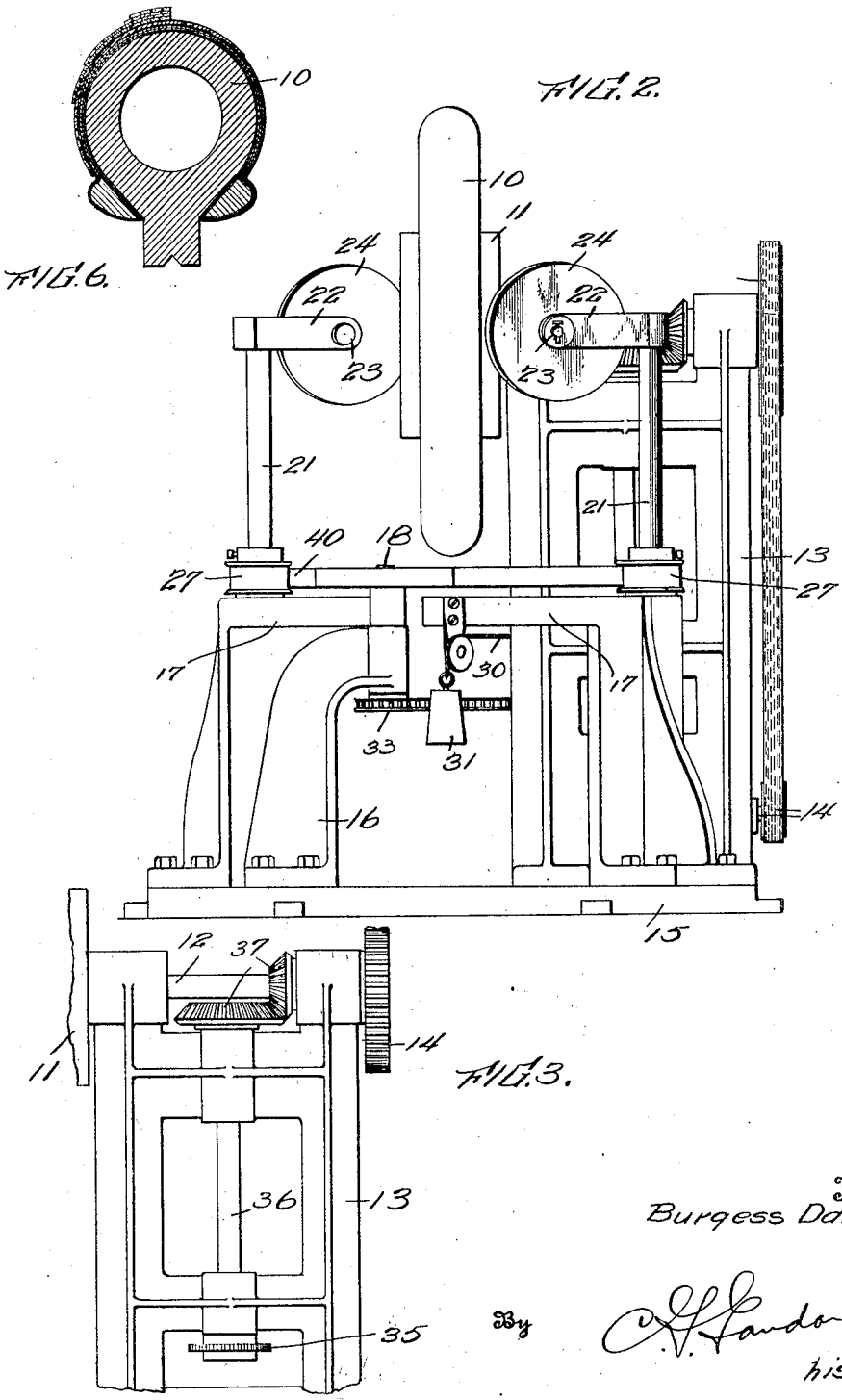
Inventor
Burgess Darrow,
By
his Attorney.

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

APPARATUS AND METHOD FOR BUILDING PNEUMATIC TIRES.

1,335,879. Specification of Letters Patent. Patented Apr. 6, 1920.

Application filed August 9, 1918. Serial No. 249,098.

*To all whom it may concern:*

Be it known that I, BURGESS DARROW, a citizen of the United States, and resident of Akron, Ohio, have invented new and useful Improvements in Apparatus and Methods for Building Pneumatic Tires, of which the following is a specification.

My present invention relates to tire construction, and more particularly to applying the side walls and tread portion to tires of the pneumatic type.

It is the principal object of the present invention to provide a combination tread and side wall that may be built up out of comparatively narrow strips that have been previously calendered or prepared in any suitable manner.

Another object of my invention is to provide a side wall and tread that is easily applied to the tire carcass with the different thicknesses of the tread portion and side walls essential to the manufacture of the practical tire in the correct positions.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 represents a top plan view of my proposed apparatus;

Fig. 2 is an end view of the same;

Fig. 3 is a detail of the core supporting standards;

Fig. 4 is a sectional view taken on the line 4—4 of Fig. 1;

Fig. 5 is a sectional view taken on the line 5—5 of Figure 1; and

Fig. 6 is a sectional view of the core and carcass partly finished with the finishing strips.

In providing means for rotating the usual carcass forming mandrel designated as 10 in the drawings, I propose to use any suitable construction, preferably that shown, which consists of a chuck 11 secured on the end of a suitable driving spindle or shaft 12 which is mounted in bearings upon a standard 13. Any suitable means may be employed for rotating the said mandrel and for the purpose of illustration I have shown a motor, chains and driving sprockets designated as a whole by 14.

The before mentioned driving apparatus is securely fastened or otherwise secured to a common bed plate 15 so designed as to support a pair of upright guides 17. There is also mounted upon the said bed plate 15 a pair of upright standards 16 which provide suitable bearings for a pair of shafts 18 to which are secured the cam arms 19 for a purpose later to be described.

The guides 17 are preferably semi-circular in shape and have cut in them slots 20 also semi-circular in shape and adapted to receive a pair of shafts 21 carrying or supporting at their upper extremities offset arms which consist of bifurcated yokes 22 provided with suitable bearings 23 for the mounting of rotatable stock carrying bobbins 24. Washers 25 and eye bolts 26 are secured to the lower extremities of the shafts 21 to hold the same in proper working relation to the guides 17.

Also mounted on the shafts 21 and held in position by suitable collars 28 are the rotatable flange rollers 27 adapted to be operated by the cam arms 19 in a manner and for a purpose later to be described. The eye bolts 26 are secured to the ends of cables 30 which pass over sheave wheels mounted on the guides 17, and carry at their ends the weights 31 for a purpose to be later described.

The cam arm supporting shafts 18 carry at their lower extremities sprocket wheels 33 fixed thereto in any suitable manner. A sprocket chain 34 connects one of the wheels 33 to a sprocket wheel 35, mounted on an auxiliary shaft 36 which shaft is journaled in suitable bearings and driven from the main drive spindle 12 by means of the beveled gears 37. By this arrangement one of the shafts 18 is driven from the drive spindle 12 (preferably as shown in the drawing). A sprocket chain 34' passing around an auxiliary sprocket wheel 38, fast upon this driven shaft 18, engages with the sprocket wheel 33 which is fast upon the second shaft 18 at the opposite side of the machine and serves to drive said second shaft from said driven shaft 18 whereby the cam arms 19 are rotated simultaneously with the rotating carcass.

The cam arms 19 are so designed that the cam surfaces 40 contact with the flanged rollers 27 when they are in the position as shown in dotted lines in Fig. 1, and rotation of the cam arms causes the shafts 21 to be moved forward in the guide slots 20 so that the bobbins 24 are moved transversely of the tire carcass. When the shafts 21 reach the forward ends of the guide slots, the cam surfaces 40 will be at the point of being moved out of contact with the rollers 27, the shafts 21 will be returned to the rear ends of the guide slots 20 by means of the cables 30 and weights 31 as will be understood.

Operation.

Assuming a freshly prepared carcass and its mandrel or core has been mounted on the chuck 11 and that freshly filled stock carrying bobbins 24 have been positioned in the yokes 22, the operator will pass the ends of the stock from the bobbins 24 against the outer central portion of the tire carcass on each side of the machine and operate the core in slow rotation. This will cause the strips of material to be pulled off of the supply bobbins 24 and to be laid upon the carcass by means of the rotation of the core and the action of the cam arms 19 upon the rollers 27 which causes the shafts 21 to be moved forward in the slots 20 so that the bobbins 24 are moved inwardly laterally of the tire carcass. This continues until the end of the stroke of the cam arms 19 at which time the core is stopped, and the operator will sever the stock from the supply bobbins. The cam arms 19 and the cam surfaces 40 thereon are adapted to operate to impart to the bobbins 24 a movement which is comparatively slow while the bobbins are at the rear of the guides 17, and which is accelerated as the bobbins travel toward the forward ends of said guides, so that a relatively great thickness of the material is laid down at the tread portion, and the thickness of the material is lessened on the side walls toward the inner part of the tire carcass.

In Fig. 6 is illustrated the manner in which the finishing stock will be built up on one side of the core by my improved apparatus, and it is to be understood that the opposite side of the carcass will be covered in a like manner at the same time, but for the purpose of illustration and clearness, I have illustrated the carcass as finished on one side only. It will be apparent that the throw and the design of the cam arm 19 and cam surface 40 will effect the building up of the finishing stock on the carcass, and, should it be desired to place more stock adjacent the bead, another cam arm can be substituted for the cam 19 which would be of a different design and cause the shaft 21 to move in the slot 20 at a slower rate of speed at this particular point with the result that more stock would be built up as desired.

What I claim is:

1. An apparatus for applying a strip of material to a rotating tire carcass to form the tread portion and side walls of the tire, comprising the combination of a bobbin carrying the strip of material, and cam-operated means for moving said bobbin transversely of the tire carcass.

2. An apparatus for applying a strip of material to a rotating tire carcass to form the tread portion and side walls of the tire, comprising the combination of a bobbin carrying the strip of material, a cam arm, and means operatively connected to said cam arm for moving said bobbin transversely of the tire carcass, said cam arm being adapted to co-act with said means to increase the speed of movement of said bobbin inwardly laterally of the tire carcass.

3. An apparatus for applying a strip of material to a rotating tire carcass to form the tread portion and side walls of the tire, comprising the combination of a bobbin carrying the strip of material, a mounting for said bobbin so that the bobbin is movable inwardly of the tire carcass, and a cam arm adapted to impart movement to said mounting and increase the speed of the movement as the bobbin passes inwardly laterally of the tire carcass.

4. An apparatus for applying a strip of material to a rotating tire carcass to form the tread portion and side walls of the tire, comprising the combination of a bobbin carrying the strip of material, a guide, a mounting for said bobbin in said guide, and cam means adapted to impart movement to said mounting along said guide, said cam means being adapted to increase the speed of the movement of said mounting as the bobbin passes inwardly laterally of the tire carcass.

5. An apparatus for applying a strip of material to a rotating tire carcass to form the tread portion and side walls of the tire, comprising the combination of a guide, a shaft movably mounted on said guide, a bobbin mounted on said shaft and carrying the strip of material, and cam means adapted to impart movement to said shaft along said guide, said cam means being adapted to increase the speed of the movement of said shaft as the bobbin passes inwardly laterally of the tire carcass.

6. An apparatus for applying a strip of material to a rotating tire carcass to form the tread portion and side walls of the tire, comprising the combination of a guide provided with a curved slot, a shaft movably mounted in said slot, a bobbin mounted on said shaft and carrying the strip of material, and cam means adapted to impart movement to said shaft along said slot, said cam means being adapted to increase the speed of the movement of said shaft as the bobbin passes inwardly laterally of the tire carcass.

7. An apparatus for applying a strip of material to a rotating tire carcass to form the tread portion and side walls of the tire, comprising the combination of a guide provided with a curved slot, a shaft movably arranged in said slot, a bobbin mounted on said shaft and carrying the strip of material, and cam means adapted to move said shaft from the rear end to the forward end of said slot, said cam means being adapted to increase the speed of the movement of said shaft as the latter passes toward the forward end of said slot, and means to return said shaft to the rear end of said slot.

8. An apparatus for applying a strip of material to a rotating tire carcass to form the tread portion and side walls of the tire, comprising the combination of a guide provided with a curved slot extending laterally of the tire carcass, a shaft movably arranged in said slot, a bobbin mounted on said shaft and carrying the strip of material, and cam means adapted to move said shaft from the rear end to the forward end of said slot, said cam means being adapted to increase the speed of the movement of said shaft as the bobbin passes inwardly laterally of the tire carcass.

9. The method of constructing a tire which consists in rotating the tire carcass, winding a strip of rubber material on the tire carcass to form the tread portion of the tire, and moving the strip of rubber material inwardly laterally of the tire carcass at an accelerated speed and winding it on the tire carcass to form the side wall of the tire of less depth than that of the tread portion.

10. The method of constructing a tire which consists in rotating the tire carcass at substantially uniform speed, winding a comparatively narrow strip of rubber material on the tire carcass to form the tread portion of the tire, and moving the annular strip of rubber material inwardly laterally of the tire carcass at an increased speed and winding it on the tire carcass to form the side walls of the tire of less depth than that of the tread portion.

11. The method of applying the tread portion and side walls to a carcass of a tire in finishing the tire, which consists in rotating the tire carcass, winding circumferentially on the tire carcass a strip of material to form the tread portion of the tire, then moving the strip of material inwardly laterally of the tire carcass and winding it on the tire carcass to form the side wall of the tire, the speed of movement of the strip of material inwardly laterally of the tire carcass being regulated relatively to the speed of rotation of the tire carcass to make the depth of the material which is wound on the side wall less than the depth of the material which is wound on the tread portion.

12. An apparatus for building a laminated tread and side wall upon a rotating tire carcass comprising, a revoluble strip-carrying bobbin movable in a substantially arcuate path, transversely, and radially of said rotating carcass, means for imparting movement to the bobbin in one direction in its arcuate path with gradually increasing speed, and means for automatically returning said bobbin to the point of its initial movement.

13. An apparatus for building a laminated tread and side wall upon a rotating tire carcass comprising, a revoluble strip-carrying bobbin movable in a substantially arcuate path, transversely, and radially of said rotating carcass, means operating simultaneously with the rotating carcass for imparting movement to the bobbin in one direction with gradually increasing speed, and means for automatically returning said bobbin to the point of its initial movement.

In witness whereof, I have hereunto signed my name in the presence of two subscribing witnesses.

BURGESS DARROW.

Witnesses:
R. S. TROGNER,
E. C. LEADENHAM.